(12) United States Patent
Yamagishi (10) Patent No.: US 7,878,082 B2
(45) Date of Patent: Feb. 1, 2011

(54) SLIDING DEVICE FOR USE IN CONFINED SPACES

(75) Inventor: Kazuki Yamagishi, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 897 days.

(21) Appl. No.: 11/099,657

(22) Filed: Apr. 6, 2005

(65) Prior Publication Data

US 2005/0257633 A1 Nov. 24, 2005

(30) Foreign Application Priority Data

May 13, 2004 (JP) ............................. 2004-143075

(51) Int. Cl.
*F16H 3/06* (2006.01)
(52) U.S. Cl. ..................................... 74/89.33; 74/89.32
(58) Field of Classification Search ................. 74/89.33, 74/89.32
See application file for complete search history.

(56) References Cited

U.S. PATENT DOCUMENTS

| | | | | |
|---|---|---|---|---|
| 5,484,051 A * | 1/1996 | Nagai et al. | ............... | 198/750.7 |
| 6,308,821 B1 * | 10/2001 | Asai et al. | ................ | 198/750.7 |
| 6,344,718 B1 * | 2/2002 | Nagai et al. | .................... | 318/14 |
| 6,581,508 B2 * | 6/2003 | Kudo et al. | ................. | 92/85 R |
| 6,848,327 B2 | 2/2005 | Nagai et al. | | |
| 7,562,595 B2 * | 7/2009 | Kato | ........................... | 74/89.4 |
| 2001/0015581 A1 * | 8/2001 | Sato et al. | ..................... | 310/12 |
| 2003/0098551 A1 * | 5/2003 | Kato | ........................... | 277/650 |
| 2003/0121759 A1 * | 7/2003 | Kawashima et al. | ........ | 198/494 |
| 2003/0224890 A1 * | 12/2003 | Nagai et al. | ................. | 474/144 |
| 2004/0093970 A1 * | 5/2004 | Iida et al. | ................... | 74/89.33 |

FOREIGN PATENT DOCUMENTS

| JP | 11-30234 | 5/1989 |
|---|---|---|
| JP | 2002-174317 | 6/2002 |
| JP | 2001-12465 | 7/2002 |

\* cited by examiner

*Primary Examiner*—Richard W Ridley
*Assistant Examiner*—Alan B Waits
(74) *Attorney, Agent, or Firm*—Browdy and Neimark, PLLC (57) ABSTRACT

A sliding device is provided in which a ball-nut screw system is disposed in a relation lying out of a guide rail and extending by the side of and in parallel juxtaposition with the guide rail, thereby making it possible to reduce the sliding device in the overall height. The ball-nut lead screw system may be easily mounted and/or demounted from the sliding device and easily made varied depending on design considerations. The sliding device includes the lead screw carried for rotation by bracket bearings in a way lying out of a guide rail in a way extending by the side of and in parallel juxtaposition with the guide rail, and a ball nut mounted to a slide table. The lead screw is actuated by a motor carried in a bracket bearing.

1 Claim, 10 Drawing Sheets

SLIDING DEVICE FOR USE IN CONFINED SPACES

FIELD OF THE INVENTION

The present invention relates to a sliding device adapted for the use in a confined space of a variety of machinery including machine tools, semiconductor manufacturing equipments, various assembling machines, testing instruments, and so on.

BACKGROUND OF THE INVENTION

Recent sliding devices have been needed to meet anticipated design specifications in extensively increased fields as diverse as machine tools, semiconductor manufacturing equipments, various assembling machines, testing instruments, and so on. An example of the sliding device compact or slim in construction is disclosed in, for example the Japanese Patent Laid-Open No. H11-30234 in which a guide rail is made of a pair of lengthwise sides joined together with one another while a lengthwise lead screw is carried at forward and aft ends thereof with bearing blocks that are rested above the guide rail. A slider is detachably connected with a ball nut mating with the lead screw to move on the guide rail in a sliding manner. The sliding device as recited earlier is made easier in disassembling/reassembling works to perform the maintenance or change the guide rail in length, the lead screw in lead or diameter, and the like, and further made readily in various operations to mount the bearing blocks on the guide rail.

With the sliding device constructed as stated earlier, nevertheless, the slider is raised higher because the lead screw to force the slider relatively to the guide rail is laid above the slider that fits into the guide rail, whereby the sliding device would become tall in the overall height from the bottom of the guide rail to the top surface of the slider. Thus, the prior sliding device could not be availed in the site constrained in height dimension. This means that the prior sliding devices of the type constructed as stated earlier are not ready for the appliance less in the overall height.

Further for example in the Japanese Patent Laid-Open No. 2002-174317 there is disclosed an actuator in which a ball-nut screw unit is combined detachably with a machine frame. With the prior actuator recited above, a slider is recessed at the top surface thereof in the form of U-shape in transverse section, which extends in the axial direction of the slider to allow the ball-nut screw unit to fit detachably into the recess from above. In the slider of the actuator, there is made at the recess a rectangular window open to the bottom of the slider to accommodate therein a return tube where balls are allowed to roll through there to force the ball nut to move forward and backward along the lead screw. This construction as stated earlier helps reduce the overall height of the slider.

The prior actuator made therein with the window for the return tube as well as the U-shape recess for the ball-nut screw unit, however, would be inconvenient for the ball-nut screw units, which are different in design specifications. Moreover, the slider, as much material being removed to make the recess and window, would get less in mechanical stiffness, unavailable for the appliances large in load capacity.

A linear motion guide unit is disclosed in, for example the Japanese Patent Laid-Open No. 2001-12465, which makes it possible to keep a workpiece at the desirable position and posture upon any working and/or feeding process of the workpiece. With the prior linear motion guide unit recited just above, the machine bed and the workpiece table are both provided thereon with fixed surfaces of reference, respectively, against which their associated guide rail and workpiece table are mounted with keeping accurately their preselected positions and postures, whereby the workpiece table may be well kept in the desired posture relatively to the guide rail while the workpiece table travels together with the slider along the guide rail. The prior linear motion guide unit recited above is comprised of the guide rail and the slider, which are combined together in a relation that the slider fits snugly into between widthwise opposing sides of the guide rail, but the slider head thereof rises in height above the tops of the sides of the guide rail. The guide rail is provided with a first surface of reference against which a mounting surface formed on the machine bed comes in abutment, while the slider head is provided with a second surface of reference against which a mounting surface formed on the workpiece table comes in abutment.

SUMMARY OF THE INVENTION

The present invention, therefore, has as its principal object to overcome the problems stated earlier and, in particular, to provide a sliding device that is extensively acceptable for standard specifications and has a sliding unit composed of a guide rail and a slider traveling relatively to the guide rail, and a lead screw lying out of the guide rail in a way extending by the side of and in parallel with the guide rail, as opposed to the prior sliding device disclosed in the commonly owned the Japanese Patent Laid-Open No. H11-30234. The major concept of the present invention is to provide the sliding device that is made reduced in the overall height as compared with the same sort of the prior sliding device. Another concept of the present invention is to provide a sliding device in which the lead screw may be easily made varied depending on design considerations with no need of altering the specifications of the associated linear motion guide unit and also mounted and demounted from the linear motion guide unit. Making the sliding device as small as possible in overall height is convenient for the installation in the site constrained in height dimension, and ready to customize the device in compliance with user's application and usage, even with simple construction as well as inexpensive cost.

The present invention is concerned with a sliding device; comprising an elongated guide rail, a slide table movable along the guide rail in a sliding manner, and a ball-nut screw system mounted detachably to the slide table to move the slide table for reciprocation; wherein ball-nut screw system is comprised of a lead screw carried for rotation by a pair of bracket bearings in a way lying by any one side of and in parallel juxtaposition with the guide rail, and a ball nut mounted to the slide table to mate with the lead screw to move for reciprocation along the lead screw; wherein the bracket bearings are each comprised of a support end attached to the guide rail in a manner resting on the guide rail, and a bearing portion extending from the support end sidewise of the guide rail to carry the lead screw for rotation; and wherein the lead screw is actuated by a motor carried in any one of the bracket bearings.

In one aspect of the present invention, a sliding device is provided in which the guide rail is formed in a U-shaped configuration in transverse section made up of a pair of side walls and a bottom integral with the side walls, the bottom being provided with a mating surface that is used to fasten the sliding device to any other object, and wherein the bracket bearings are fastened to top surfaces of the side walls of the guide rail in a way resting on the side walls at their support ends.

In another aspect of the present invention, a sliding device is provided in which the slide table includes the slider that fits between the side walls of the guide rail for sliding movement by virtue of rolling elements, and a table component secured on an upper surface of the slider and installed with the ball nut outside any one of the side walls, the table component also having an upper surface on which any object including workpiece is secured.

In a further another aspect of the present invention, a sliding device is provided in which the ball-nut screw system is comprised of a ball nut and a ball screw, the ball screw being carried for rotation at axially opposite ends thereof with the paired bracket bearings through bearings installed in the bracket bearings while the ball screw being connected at any one axial end thereof to an output shaft of the motor through a coupling.

In another aspect of the present invention a sliding device is provided in which there is provided a shield to cover an upside open space extending lengthwise of the guide rail as well as an open space surrounding upper and side areas of the ball-nut screw system to prevent any foreign matter from moving in and out, the shield being made of a sheet that is worked in the form of L-shape in transverse section.

In another aspect of the present invention, a sliding device is provided in which the bracket bearings provide a motor bracket and an end bracket, respectively, wherein the bracket bearing serving as the motor bracket includes a bearing portion having a bearing housing to receive the bearing to carry the lead screw therein, and another bearing portion made integral with the bearing housing and made with an opening to receive the motor therein, and wherein there is formed a recess made open downwards between the first bearing housing and the bearing housing to accommodate therein the coupling to join the output shaft of the motor with the mating end of the lead screw.

The sliding device constructed as stated earlier is remarkably reduced in the overall height, compared with the sliding device disclosed in the commonly owned Japanese Patent Laid-Open No. H11-30234. Especially, the sliding device of the present invention is beneficial to make the sliding device compact in construction of the type having the guide rail that is made of a pair of side walls interconnected with one another. With the sliding device constructed as stated earlier, the ball nut mating with the lead screw to move for reciprocation the slide table along the guide rail is mounted detachably to the slide table while the lead screw is carried at the axial opposing ends thereof on the bracket bearings that are fastened on the top surfaces of the guide rail. Just exchanging the lead screw in the ball-nut screw system is sufficient to cope with maintenance of the sliding device and various design versions including altering the guide rail in length, the lead screw in lead or diameter, and the like. Thus, the sliding device of the present invention may be made easier in disassembling/reassembling works, and further made readily in various operations to mount the bracket bearings on the guide rail.

The above and other related objects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

Referring now in detail to the accompanying drawings, a preferred embodiment of a sliding device according to the present invention will be explained below. The sliding device of the present invention will be well used in a diversity of machinery including semiconductor manufacturing apparatus, machine tools, various assembling apparatus, precision testing/measuring instruments, position control tables, sliding tables and so on, which have relatively sliding members that are not only needed to work in any controlled atmosphere including clean rooms, laboratories and the like, but also expected to in reverse work in an environment contaminated with dust and dirt.

Figure 8:
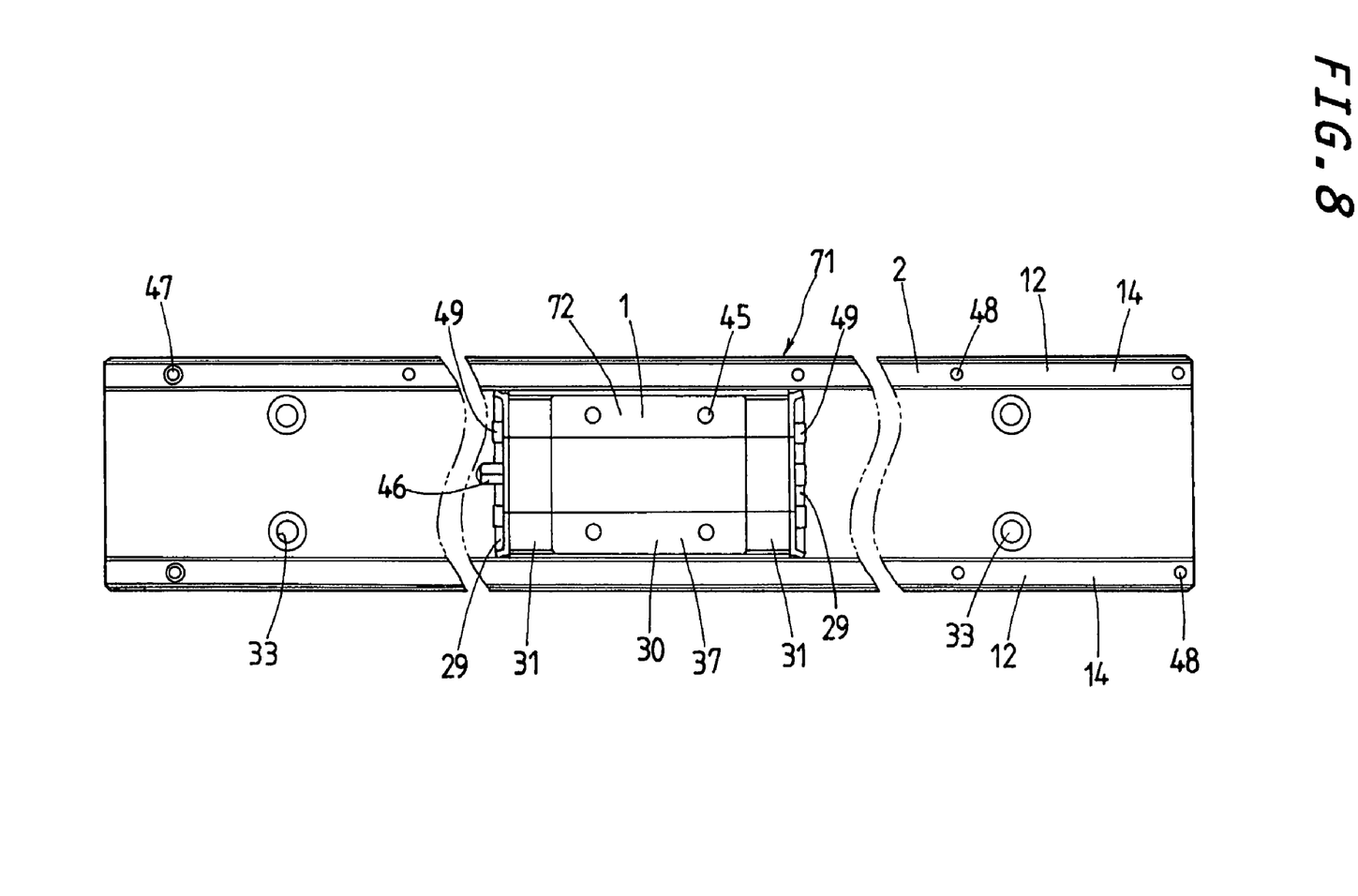
FIG. 8 is a fragmentary plan view showing a linear motion guide unit incorporated in the sliding device of FIG. 6.
Figure 9:
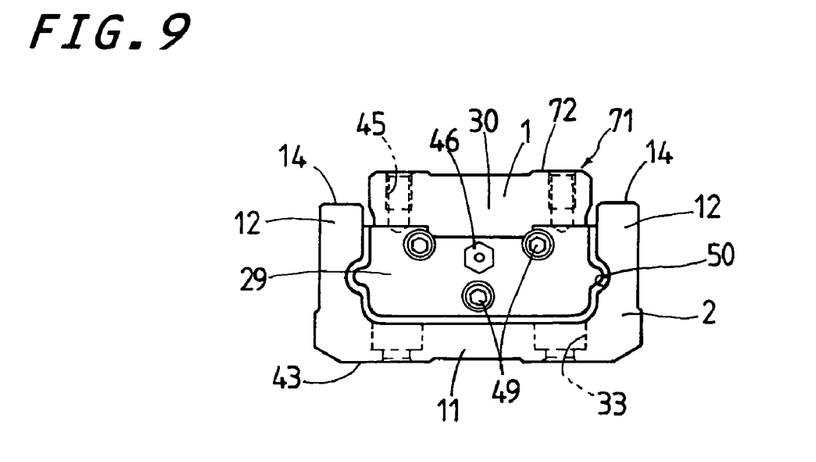
FIG. 9 is a view in side elevation of the linear motion guide unit of FIG. 8.

A constructional features of the sliding device of the present invention, as seen in FIGS. 8 and 9, are well availed in the linear motion guide unit comprised of a guide rail and a slider as disclosed in the commonly owned Japanese Patent Laid-Open No. 2001-12465. The sliding device discussed later, besides the constructional features disclosed in the Japanese Patent Laid-Open No. H11-30234, has the advantages of less in the overall height, higher in mechanical strength, more compact in construction, even with simple in construction.

The sliding device of the present invention, as shown in FIGS. 1 to 7, features that a lead screw 7 is placed out of a guide rail 2 in a way lying by the side of and in parallel juxtaposition with the guide rail 2 so as to extend along any one side wall 12 of the guide rail 2, whereby the sliding device is made reduced in the overall height.

With the sliding device constructed as stated just above, bracket bearings one of which is an end bracket 8 and another is a motor bracket 9 are installed at forward and aft ends of the guide rail 2, one to each end, to carry the lead screw 7 at the lengthwise opposite ends thereof. The ball-nut screw system 3 lying out of a guide rail 2 in parallel juxtaposition with the guide rail 2 so as to extend side by side with any one side wall 12 of the guide rail 2 is carried at lengthwise ends thereof with the bracket bearings 8 and 9, which are fastened at their support ends 62 and 64 onto top surfaces 14 of the paired side walls 12 of the guide rail 2. The side walls 12 of the guide rail 2 are made with threaded holes 47 into which fastening screws 36 fit to join the bracket bearing or end bracket 8 to the guide rail 2. The side walls 12 of the guide rail 2 are also made with other threaded holes 48 into which fastening screws 27 fit to join the bracket bearing or motor bracket 9 to the guide rail 2. The bracket bearings 8 and 9 has at their end surfaces lock stoppers 22, one to each bracket bearing, to make it easy to attach and detach the ball-nut screw system 3 out of the linear motion guide unit 71, especially, the top surfaces 14 on the side walls 12 of the guide rail 2, thereby making the maintenance work of the ball-nut screw system 3 easier, making sure of easy disassembling/reassembling works to perform the change of the guide rail 2 in length, the alteration of the lead screw 7 in length, lead, diameter, and so on, and further helping render various operations to mount the bracket bearings 8, 9 on the guide rail easier.

A slide table 4 is first prepared separately from the linear motion guide unit 71 and joined at a table component 15 thereof to the slider 1 with using fastening screws 24. The slide table 4 includes the slider 1 that fits between the side walls 12 of the guide rail 2 for sliding movement by virtue of rolling elements, not shown, and the table component 15 secured on the upper surface 37 of the slider 1 and installed with a ball nut 6 outside any one of the side walls 12. The table component 15 also has an upper surface 26 on which any object including workpiece, cargo, members, and so on is secured. The table component 15 is made of steal material or cast iron to ensure the desired rigidity.

The sliding device is comprised of the elongated guide rail 2, the slide table 4 movable in a sliding manner along the guide rail 2, and the ball-nut screw system 3 mounted detachably to the guide rail 2 to force the slide table 4 for reciprocation. The ball-nut screw system 3 is composed of the lead screw 7 lying in parallel juxtaposition with the guide rail 2 so as to extend side by side with any one side wall 12 of the guide rail 2, the lead screw 7 being carried for rotation at lengthwise ends thereof with the bracket bearings 8 and 9, which fastened to the guide rail 2, and the ball nut 6 fastened to the slide table 4 to mate with the lead screw 7 for reciprocation along the lead screw 7.

The bracket bearing 8 also serves as the end bracket connected with any one lengthwise end of the lead screw 7. The bracket bearing 8 is made up of the support end 64 that is fastened to the guide rail 2 with resting on the guide rail 2, and a bearing portion 65 extending sidewise from the support end 64 to carry there the lead screw 7 for rotation with a rolling-contact bearing 13. Another bracket bearing 9 is mounted to another end of the lead screw 7 to provide a motor bracket 28 to which a motor 5 is connected through a motor attachment 17. The second bracket bearing 9 also includes the support end 62 that is fastened to the guide rail 2 with resting on the guide rail 2, and a bearing portion 59 extending sidewise from the support end 62 to carry there the lead screw 7 for rotation with another rolling-contact bearing 13. The motor 5 is made up of a driving source 18 and an encoder 19. The lead screw 7 at the end carried with the bracket bearing 9 is connected to an output shaft 32 of the motor 5 to be actuated by the driving source 18.

The guide rail 2 is made of a pair of side walls 12, and a bottom 11 integral with the side walls 12 to form a U-shape in transverse section. The bottom 11 has a lower surface 43 where the guide rail 2 is mounted to any other members. The slider 1, as shown in FIG. 8, is comprised of a carriage 30 with threaded holes 45, end caps 31 fastened to forward and aft ends of the carriage 30, one to each end, and end seals 29 attached on the outmost end faces of the end caps 31. A grease nipple 46 is connected to any one end cap 31. The end caps 31 are joined together with the end seals 29 to the carriage 30 with using fastening screws 49, shown in FIG. 9. The bracket bearings 8, 9 are secured to the paired side walls 12 of the guide rail 2 at their support ends 62, 64 that rest on the top surfaces 14 of the side walls 12. The guide rail 2 is provided with raceway grooves 50 while the carriage 30 is made with raceway grooves in opposition to the raceway grooves 50 in the guide rail 2. The slide table 4 is seated against the upper surface of the slider 1 that fits in between the side walls 12 of the guide rail 2 to move lengthwise by virtue of the rolling elements. The slide table 4 moreover has the table component 15 that is installed with the ball nut 6 lying by the side of the guide rail 2. The table component 15 also has the upper surface 26 seat thereon any object including workpiece, cargo, members, and so on.

With the sliding device constructed as stated earlier, a drive train to carry power from the motor 5 to the slider 2 is made of a ball-nut screw system 3 that is comprised of the ball nut 6, and the lead screw 7 carried for rotation with the rolling-contact bearings 13 at the lengthwise ends thereof on the bracket bearings 8, 9. The lead screw 7 is connected at the end carried with the bracket bearing 9 to the output shaft 32 of the motor 5 through the coupling 16.

The sliding device of the present invention has a shield 20 to cover an upside open space extending lengthwise across the widthwise opposing side walls 12 of the guide rail 2 as well as an open space surrounding the upper and side areas of the ball-nut screw system 3. The shield 20 is made of a sheet that is worked in the form of L-shape as a whole in transverse section. The shield 20 is fastened to the bracket bearings 8 and 9. Thus, the sliding device is enclosed almost throughout with the shield 20 that is simple in construction, but the motor 5 and a raised part 51 of the slide table 4, which will be explained later. The shield 20 of L-shape in transverse section is rich in mechanical strength, even with made of a sheet material. The shield 20 undergoes partially any hardening operation to reinforce just a flat area to cover the upside open space above the guide rail 2. The shield 20 may be made enough strengthened in stiffness by only partial reinforcement at the flat area, despite being made large in lengthwise direction. The shield 20 is fastened to the end bracket 8 and the motor bracket 9 with using screws 41.

With the sliding device constructed as stated earlier, the ball-nut screw system 3 lying in juxtaposition besides the linear motion guide unit 71 might cause a load of rotational moment to the slider 1 that travels with the object carried thereon. To cope with this, rolling elements are interposed between the slider 1 and the guide rail 2 to make sure of the smooth reciprocation of the slide table 4, thereby protecting the slider 1 against experiencing any excessive load.

Figure 1:
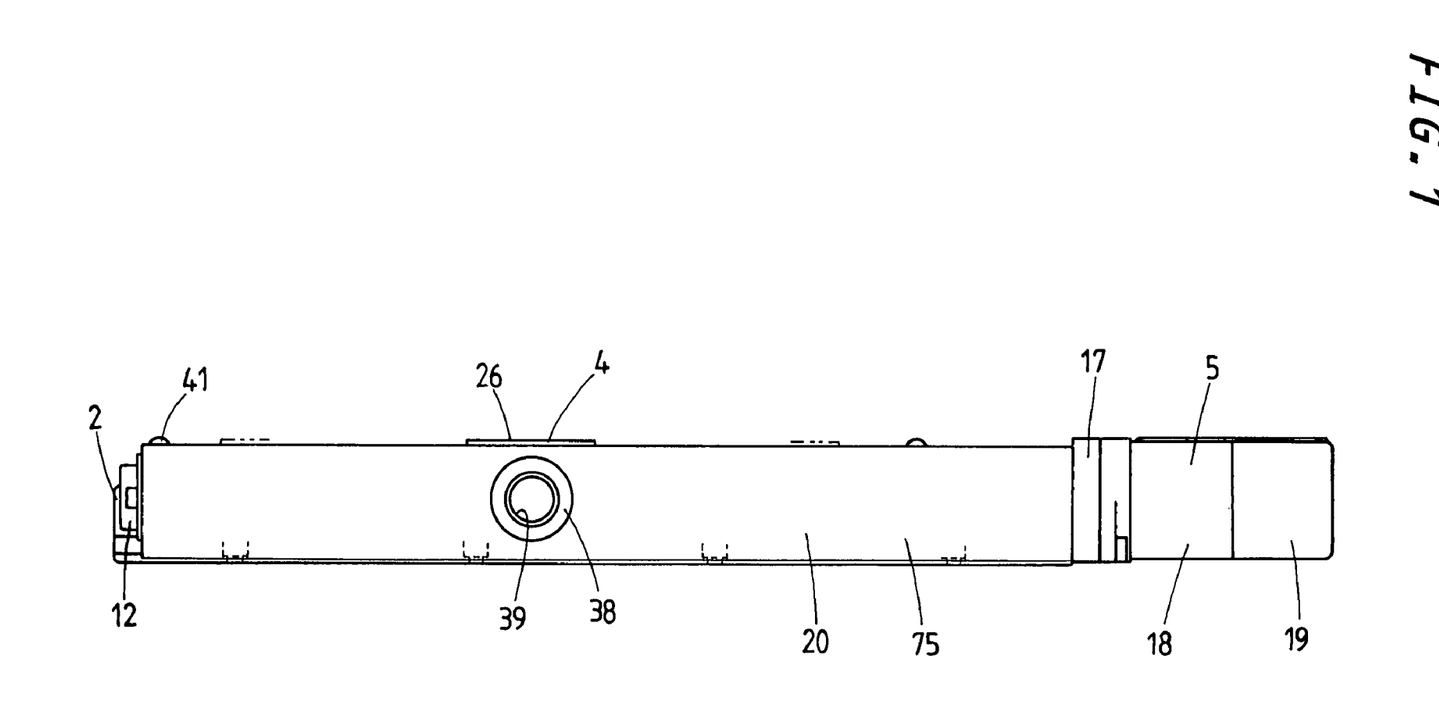
FIG. 1 is a view in front elevation showing a preferred embodiment of a sliding device according to the present invention.
Figure 2:
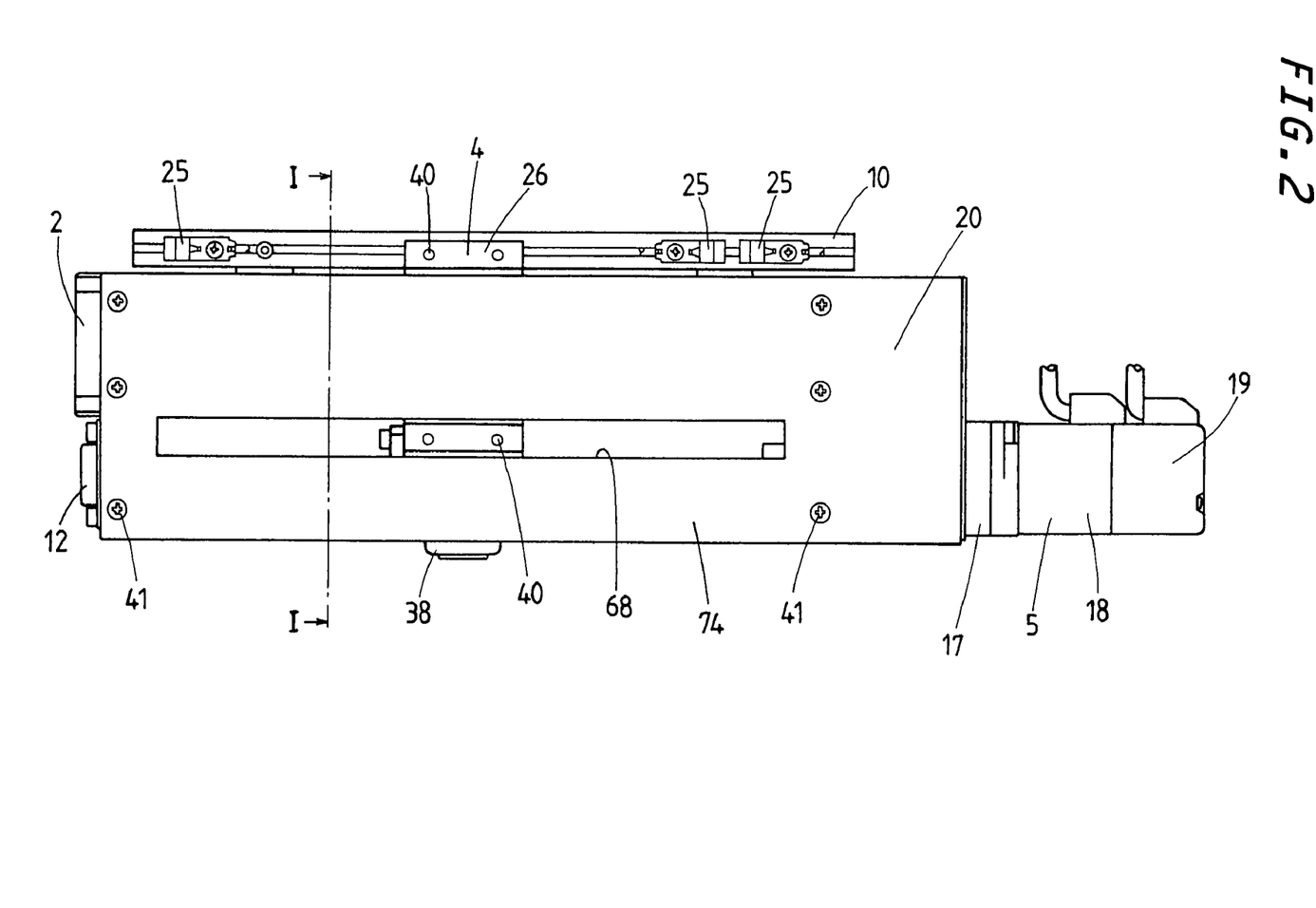
FIG. 2 is a plan view of the sliding device shown in FIG. 1.
Figure 3:
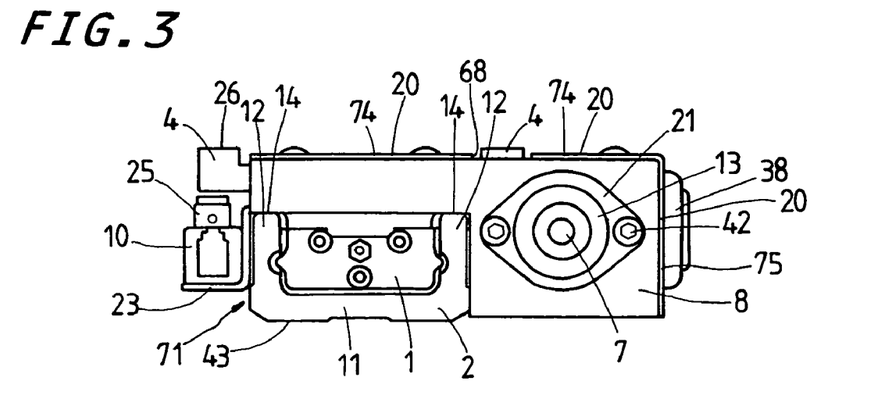
FIG. 3 is a view in left-side elevation of the sliding device of FIG. 1.
Figure 4:
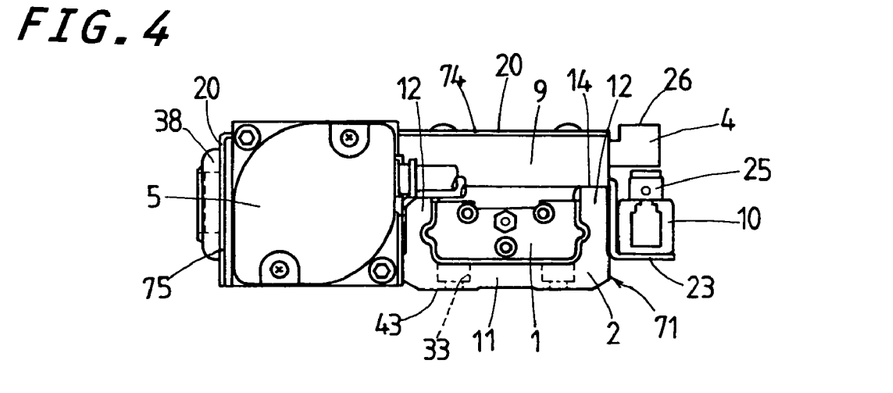
FIG. 4 is a view in right-side elevation of the sliding device of FIG. 1.
Figure 5:
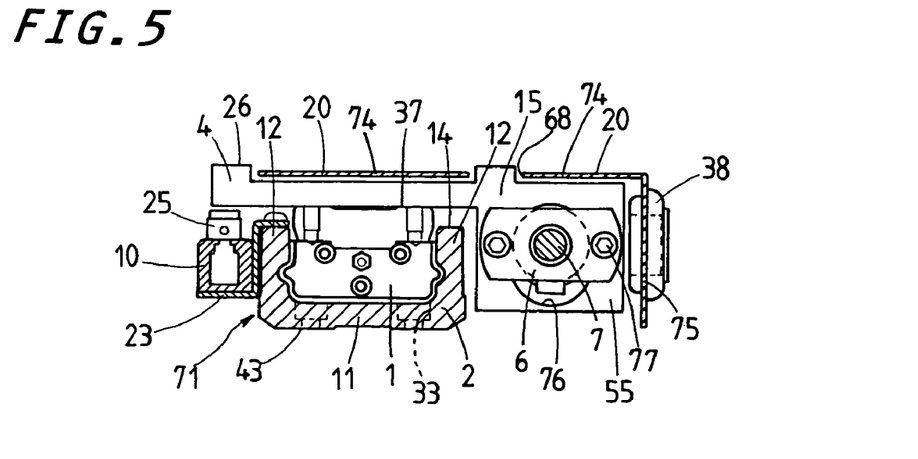
FIG. 5 is a view in transverse section of the sliding device, the view being taken on a plane of the line I-I of FIG. 2.

With the sliding device of the present invention, moreover, a sensor rail 10 is, as shown in FIGS. 2 to 6, mounted using brackets 23 on the lengthwise outside surface of another side wall 12 of the guide rail 2, which is in widthwise opposition to the side wall 12 having the ball-nut screw system 3 thereon. On the sensor rails 10 there are installed many sensors 25 including a limit sensor, origin sensor, before-the-origin sensor, and so on, which are selected depending on the operational conditions. The sensors 25 are in opposition to the underside of the slide table 4 to sense a position of the slide table 4. The shield 20, as seen in FIG. 1, is made with a lubrication port 39 in an upright panel thereof to apply lubricant to the ball-nut screw system 3 through there. A rubber-made bushing 38 is inserted into the lubrication port 39.

Figure 6:
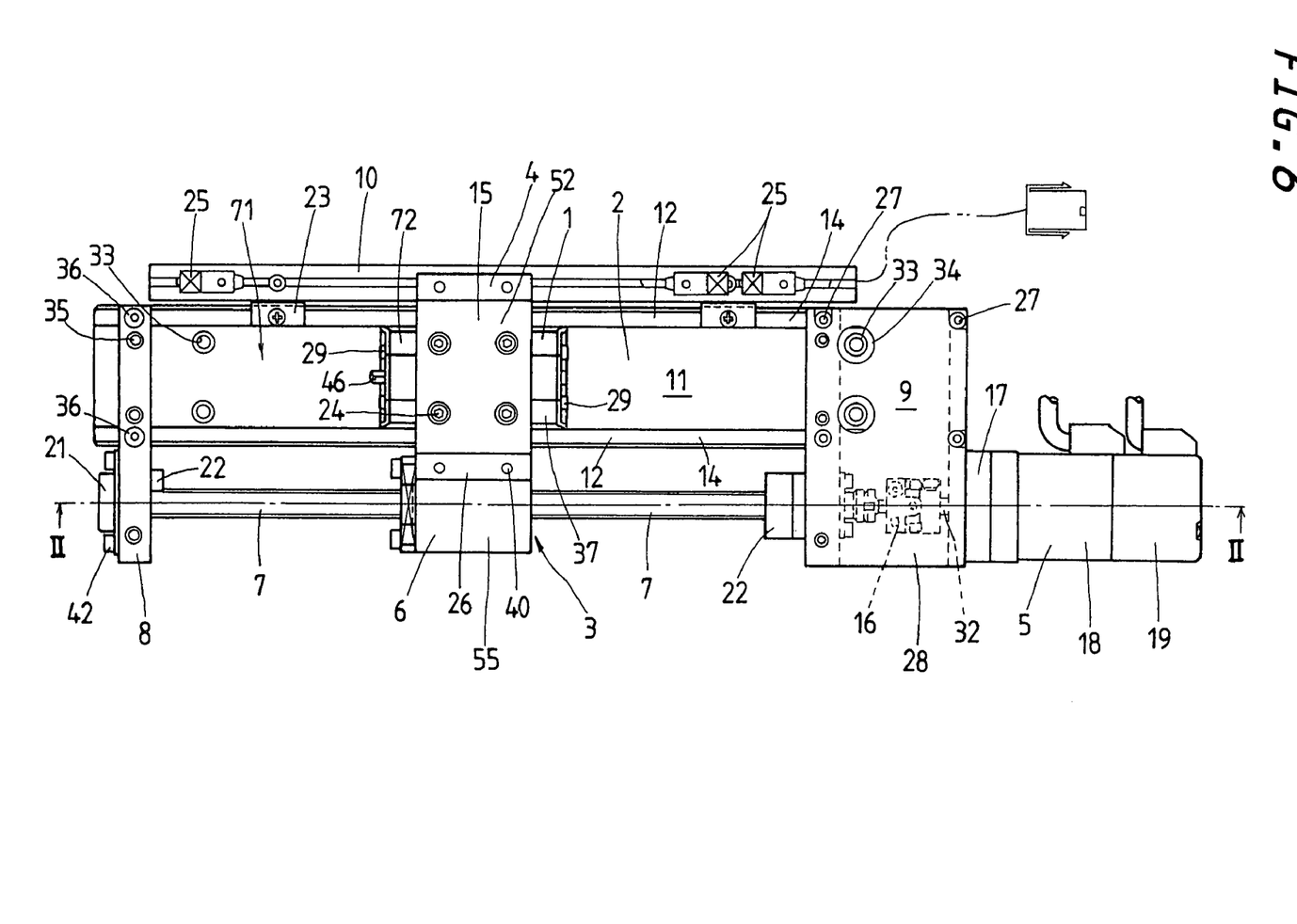
FIG. 6 is the same view as FIG. 2, but in which a covering member is shown as being removed to look into the interior thereof.
Figure 7:
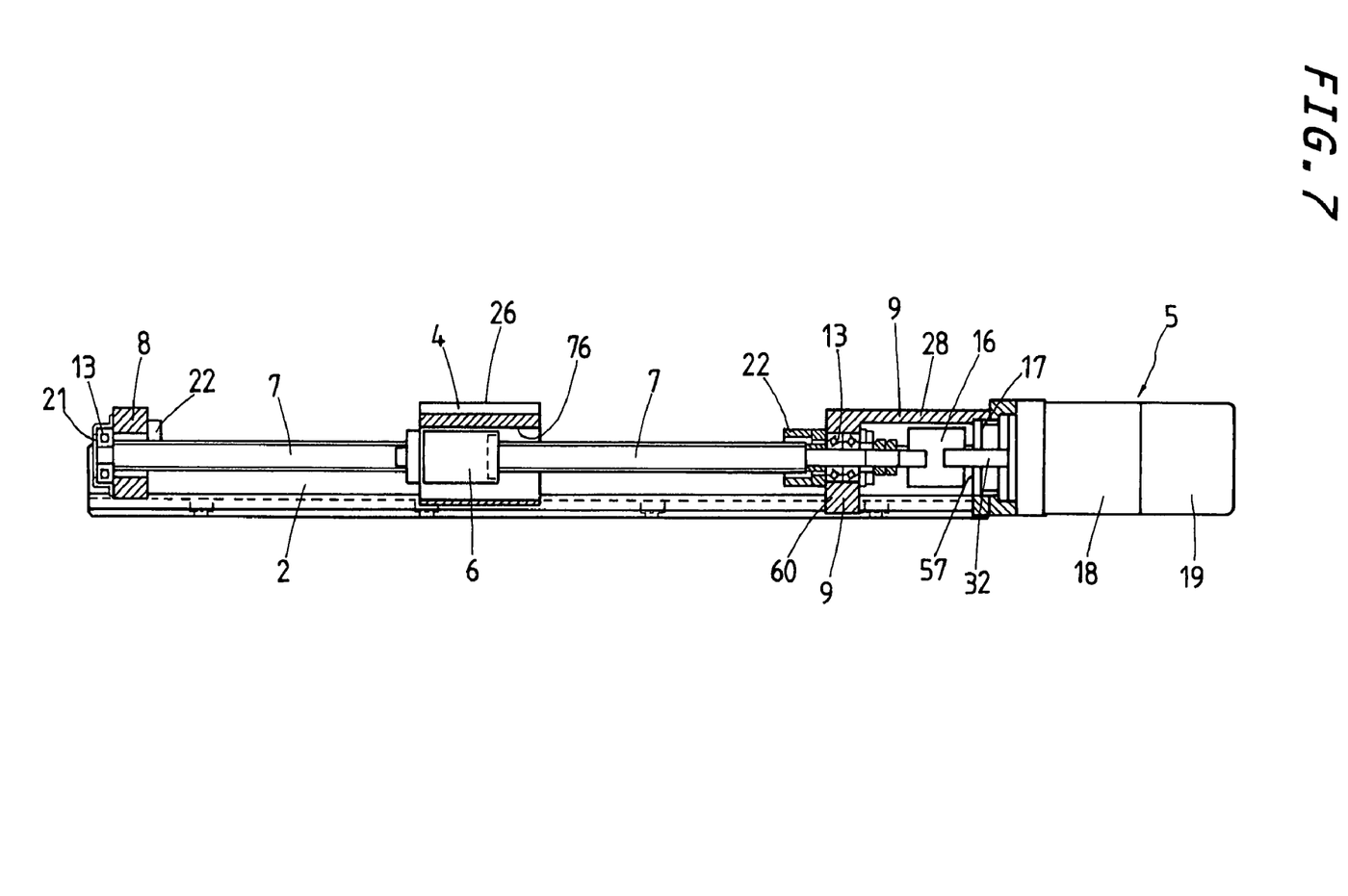
FIG. 7 is a view in longitudinal section of the sliding device, the view being taken on a plane lying on the line II-II of FIG. 6.
Figure 10:
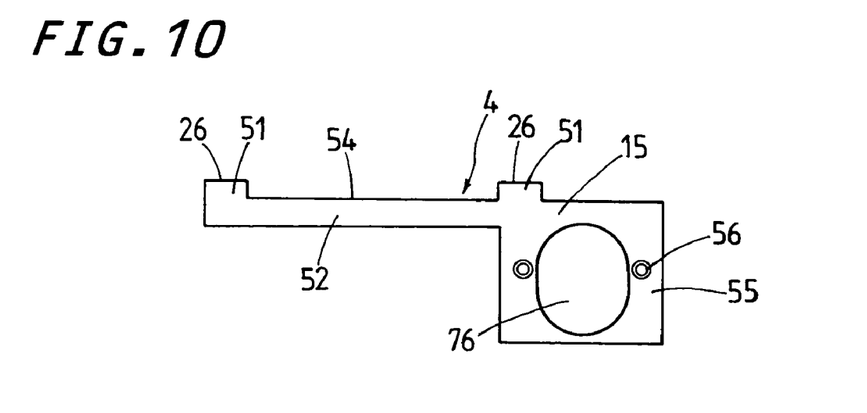
FIG. 10 is a view in front elevation of a slide table in the sliding device of FIG. 6.
Figure 11:
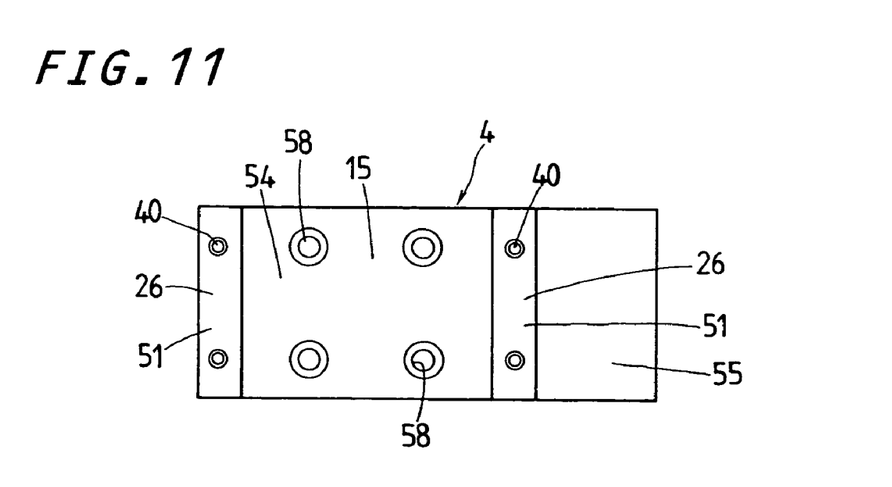
FIG. 11 is a plan view showing the slide table of FIG. 10.
Figure 12:
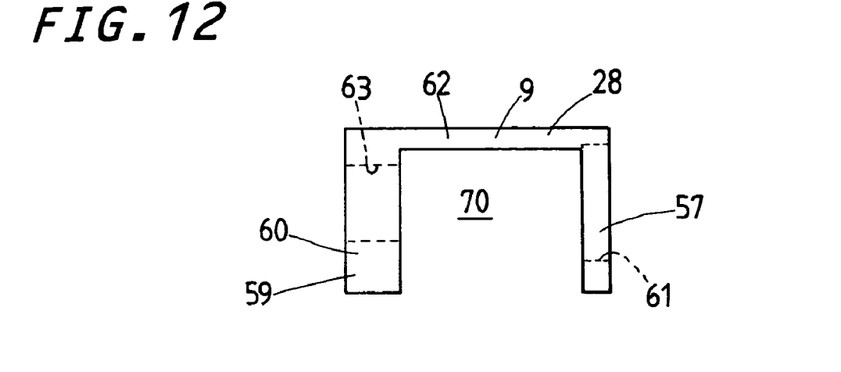
FIG. 12 is a view in front elevation of a bracket bearing to carry a lead screw thereon and also serves as a motor bracket of FIG. 6.
Figure 13:
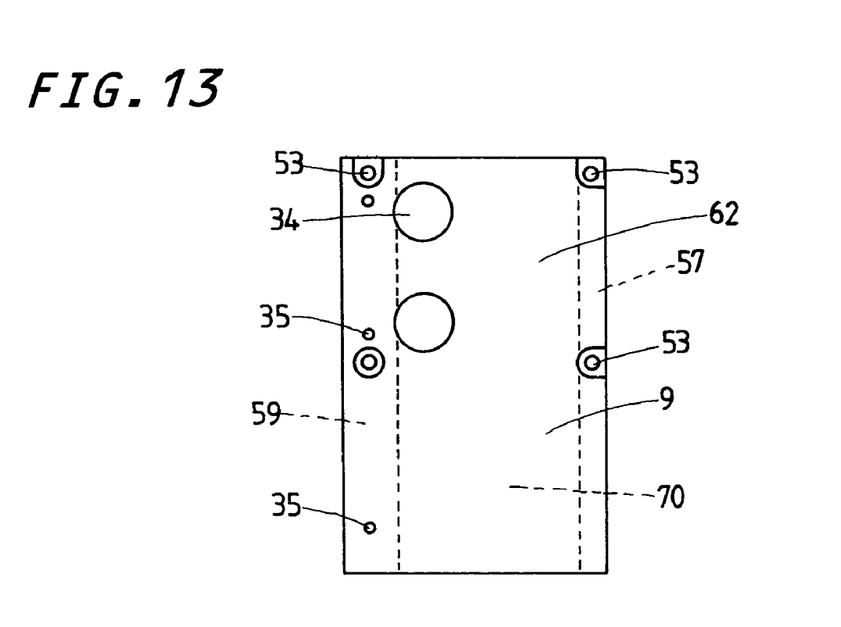
FIG. 13 is a plan view of the bracket bearing shown in FIG. 12.
Figure 14:
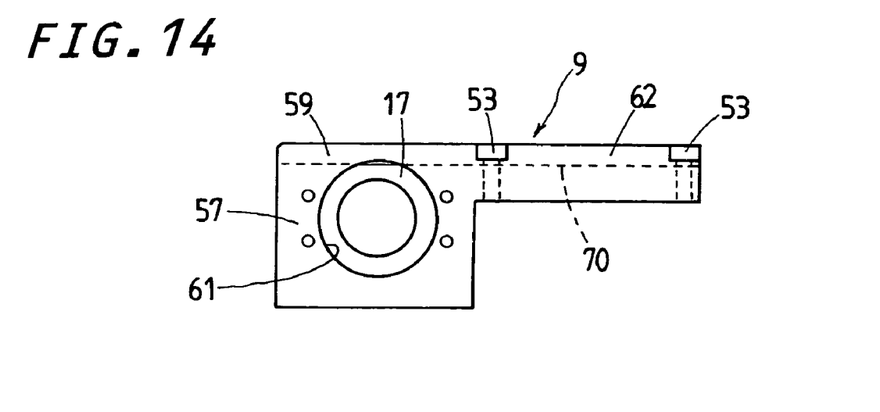
FIG. 14 is a view in right-side elevation of the bracket bearing of FIG. 12.
Figure 15:
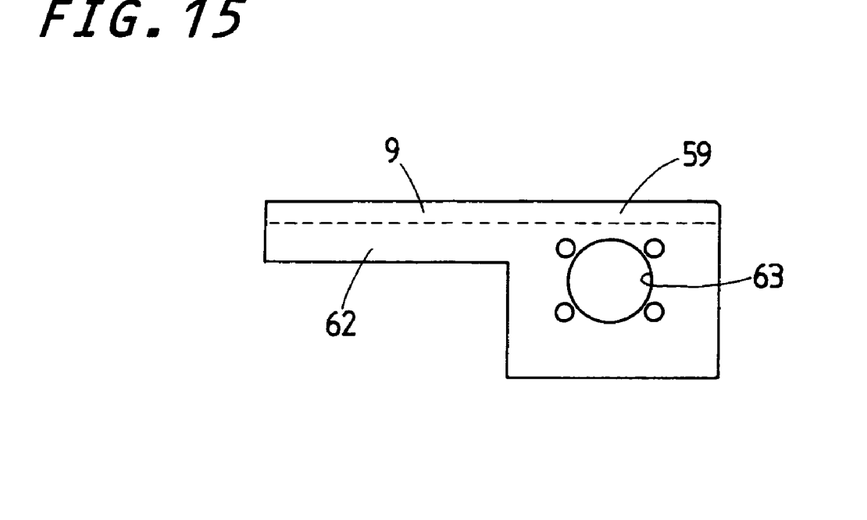
FIG. 15 is a view in left-side elevation of the bracket bearing of FIG. 12.
Figure 16:
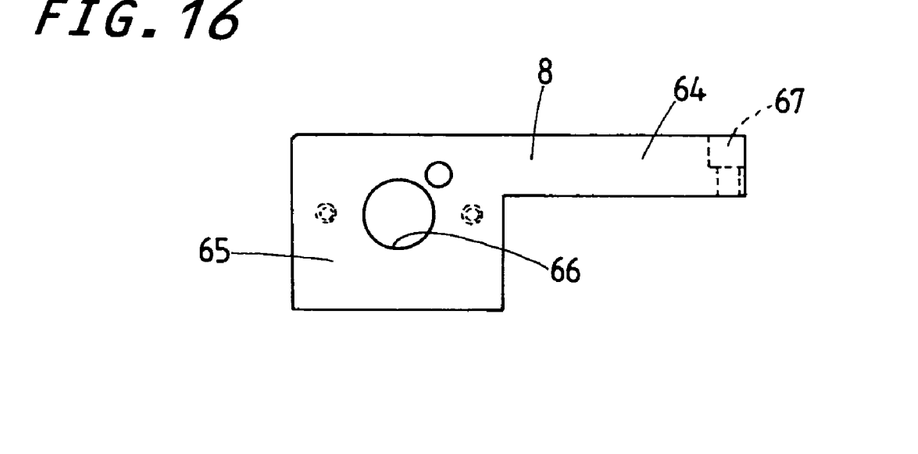
FIG. 16 is a view in front elevation of another bracket bearing to carry a lead screw thereon and also serves as an end bracket of FIG. 6.
Figure 17:
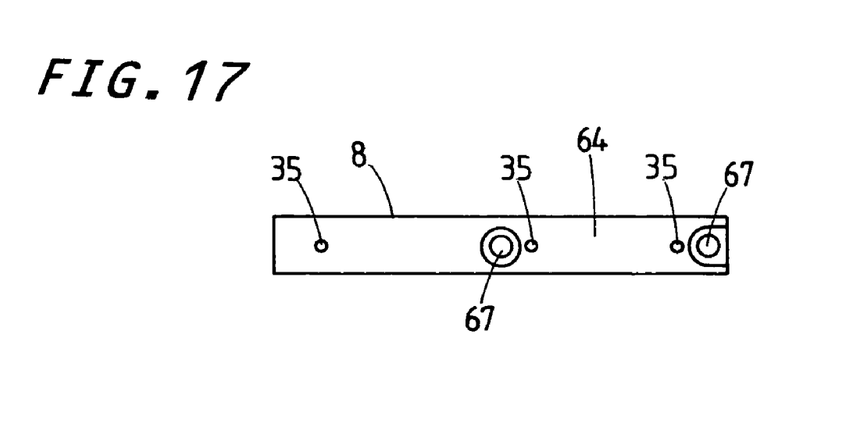
FIG. 17 is a plan view of another bracket bearing shown in FIG. 16.

With the sliding device of the present invention, the steel-made table component 15 provided for the slide table 4, as shown in FIGS. 6, 10 and 11, includes a major table portion 52 and a housing 55 receiving the ball nut 6. The major table portion 52 is partially raised above an upper surface thereof at widthwise opposing edges 51 to provide mounting surfaces 26 where there are made threaded holes 40 that are used to fasten the object including the workpiece, and so on. The shield 20 fits in a sink 54 left between the raised edges 51. The major table portion 52 is fastened to the carriage 30 in the slider 1 in a relation the bottom thereof comes into mating with an upper surface 72 of the carriage 30 by using bolts that extends through bolt holes 58 in the sink 54, followed by fitting into matching holes in the carriage 30. The nut housing 55 is made integral with the major table portion 52 in a way extending sidewise from any one side of the major table portion 52. The nut housing 55 is made therein with an elliptic aperture 76 enough in size to accommodate the ball nut 6 together with a ball-recirculating return tube, and mating threaded holes 56 that are used to fasten the ball nut 6 to the nut housing 55. Thus, the ball nut 6 is joined to the slide table 4 with using fastening screws 77 that are driven into the mating threaded holes 56 in the nut housing 55.

The bracket bearing 9, or the motor bracket, as shown in FIGS. 6, and 12 to 15, is composed of the support end 62 that is fastened using screws to the top surfaces 14 of the paired side walls 12 at any one of lengthwise ends of the guide rail 2, the bearing portion 59 extending sidewise from any one of forward and aft ends of the support end 62 to carry there the lead screw 7, and another bearing portion 57 extending sidewise from another of forward and aft ends of the support end 62 to carry there the motor 5. The bearing portion 59 to carry the lead screw 7 has a bearing housing 60 made therein with a bore 63 into which the rolling-contact bearing 13 fits to carry the lead screw 7 therein. The bearing portion 57 to carry there the motor 5 is made integral with the bearing housing 60 and made with an opening 61 to receive the motor 5 therein. Between the bearing housing 60 and the bearing portion 57 to carry there the motor 5, there is formed a recess 70 made open downwards to receive a shaft coupling 16 to join the output shaft 32 of the motor 5 with the mating end of the lead screw 7. In the bearing portion 57 to carry the motor 5, there is made the opening 61 into which the motor 5 fits in precise position. The bracket bearing 9 is made at the support end 62 thereof with bolt holes 53 that are used to fasten the bracket bearing 9 to the top surfaces 14 of the paired side walls 12 of the guide rail 2. In the support end 62, there is made through-holes 34 where bolts extends through there to fit into matching counter-bores 33 in the guide rail 2 to tighten the guide rail 2 to any other stationary part including the machine bed, and so on. The bracket bearing 9, or the motor bracket, is made on the upper surface thereof with threaded holes 35 that are used to fasten the shield 20 to the linear motion guide unit 71.

The bracket bearing 8, or the end bracket, as shown in FIGS. 6, 7, 16 and 17, is composed of the support end 64 that is fastened using screws to the top surfaces 14 of the paired side walls 12 at anther one of lengthwise ends of the guide rail 2, and the bearing portion 65 extending sidewise from the support end 64 to carry there the lead screw 7. The bracket bearing 8 is made therein with a bore 66 where the lead screw 7 is allowed to extend through there. Another end of the lead screw 7, after having extended across the bore 66, fits into the rolling-contact bearing 13, which is attached to the bearing bracket 8 with a retainer 21 of thin sheet that is fastened to the bearing bracket 8 by the use of fastening screws 42, shown in FIG. 3. The bearing bracket 8 constructed as stated just above helps keep the rotating axis of the lead screw 7 straight throughout. The support end 64 of the bearing bracket 8 is made with holes 67 that are used to fasten the bearing bracket 8 onto the top surfaces 14 of the paired side walls 12 of the guide rail 2. The bearing bracket 8, or the end bracket, is made on the upper surface thereof with threaded holes 35 that are used to fasten the shield 20 on the end bracket 8.

Figure 18:
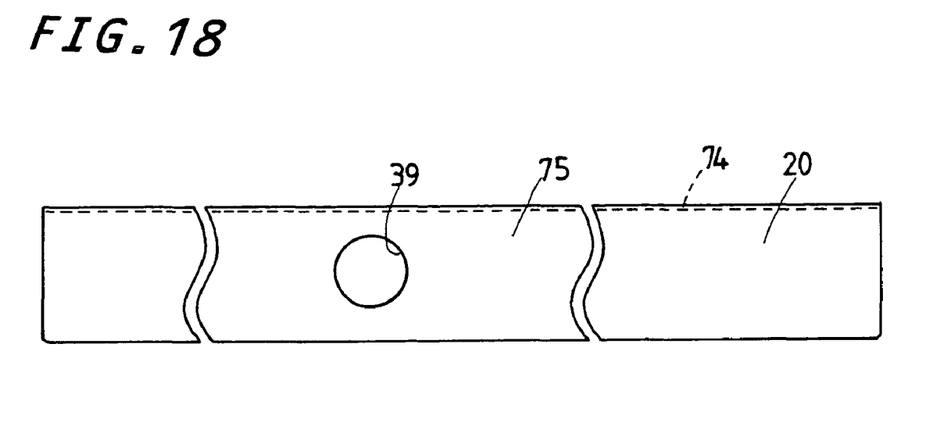
FIG. 18 is a fragmentary view in front elevation of a covering member of the sliding device in FIG. 1.
Figure 19:
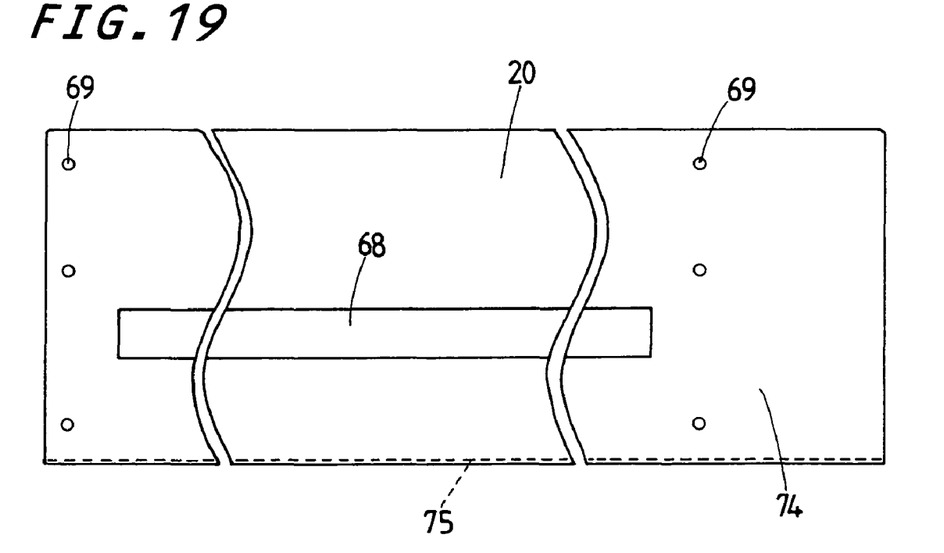
FIG. 19 is a fragmentary plan view of the covering member of FIG. 18.
Figure 20:
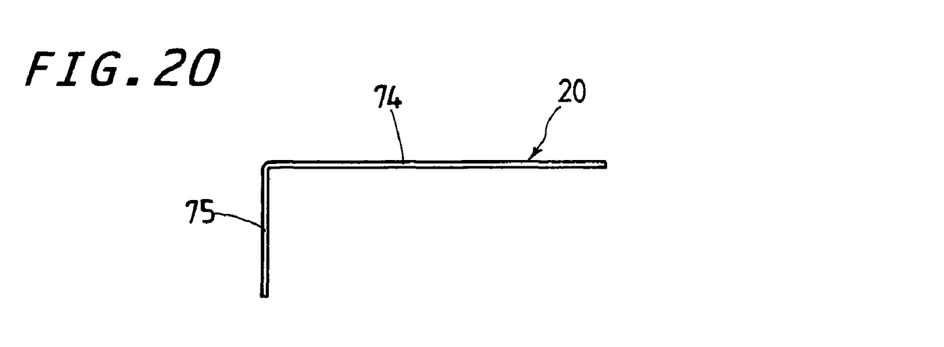
FIG. 20 is a view in side elevation of the covering member of FIG. 18.

As illustrated in FIGS. 18 to 20, the shield 20 has an upper shield portion 74 to cover the upside open space extending over the guide rail 2 as well as the lead screw 3 other than the motor 5, and a side shield portion 75 to cover the sidewise open space extending over the guide rail 2 as well as the lead screw 3 other than the motor. The shield 20 is made to extend lengthwise across the motor bracket 9 and the end bracket 8. The upper shield portion 74 is made with a window 68 that allows any one of the widthwise opposing raised parts 51 of the table component 4 to extend upwards through there for free movement relative to the shield 20. The upper shield portion 74 is made with threaded holes 69 that are used to fasten the shield 20 to the motor bracket 9 and end bracket 8. Thus, the upper shield portion 74 is fastened using screws 41 to the bracket bearings 8 and 9. The side shield portion 75 is made with a port 39 used to apply lubricant through there.

What is claimed is:

1. A sliding device comprising an elongated guide rail,
   a slide table movable along the guide rail in a sliding manner, and
   a ball-nut screw system mounted detachably to the slide table and capable of moving the slide table for reciprocation;
   wherein the ball-nut screw system is comprised of a lead screw carried for rotation by a pair of bracket bearings in a way lying out of the guide rail adjacent to one side of and in parallel juxtaposition with the guide rail, and a ball nut mounted to the slide table to mate with the lead screw and adapted to and capable of moving for reciprocation along the lead screw;
   wherein the guide rail is formed in a U-shaped configuration in transverse section made up of a pair of side walls and a bottom integral with the side walls, the bottom being provided with a mating surface;
   wherein said ball-nut screw system has an inner side facing one of the side walls, and an outer side opposite to the inner side;
   wherein the bracket bearings are each comprised of a support end fastened to top surfaces of the paired side walls of the guide rail in such a way that the bracket bearings are resting on the paired side walls at the support end, and a bearing portion extending from the support end sidewise out of the guide rail, and carrying the lead screw for rotation;
   wherein the lead screw is actuated by a motor carried in one of the bracket bearings;

wherein the slide table includes a slider that fits between the side walls of the guide rail in a way that provides sliding movement by virtue of rolling elements, and a table component integrally secured on an upper surface of the slider and installed therein with the ball nut lying outside one side of the guide rail, the table component also having an upper surface;

wherein the lead screw is carried for rotation at axially opposite ends thereof with the paired bracket bearings through bearings installed in the bracket bearings and is connected at one axial end thereof to an output shaft of the motor through a coupling;

wherein a one-piece shield of L-shape in transverse section is fastened to the bracket bearings and extends from the side wall opposite to the lead screw, over the other side wall, and downward over the outer side of the ball-nut screw system to prevent any foreign matter from moving in and out;

wherein the bracket bearings provide a motor bracket and an end bracket, respectively;

wherein the motor bracket includes the bearing portion having a bearing housing to receive the bearing adapted to and capable of carrying the lead screw therein, and another bearing portion integral with the bearing portion having an opening to receive the motor therein; and wherein a downward recess is provided between the bearing housing and the another bearing portion to accommodate therein the coupling which joins the output shaft of the motor with the mating end of the lead screw.

* * * * *